Aug. 9, 1955      L. Q. PETERSON      2,715,030
MOBILE CARRIER
Filed April 3, 1953      2 Sheets-Sheet 1
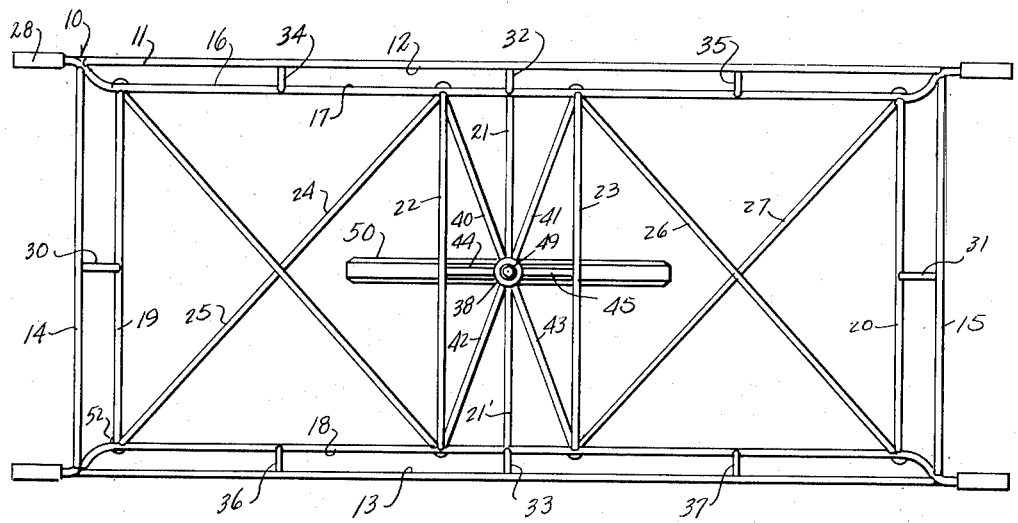
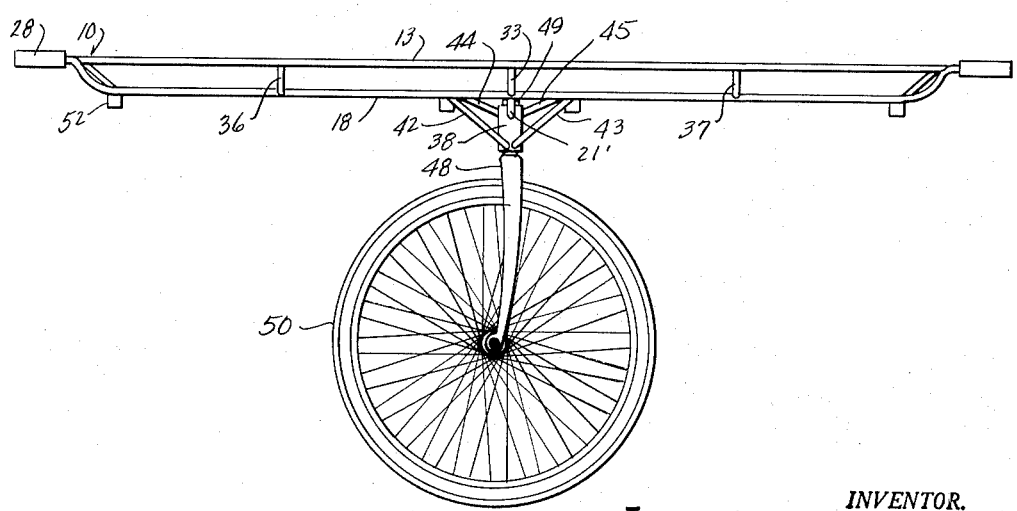
INVENTOR.
Lowell Q. Peterson,
BY
McMorrow, Berman & Davidson
ATTORNEYS Aug. 9, 1955        L. Q. PETERSON        2,715,030
                     MOBILE CARRIER
Filed April 3, 1953                    2 Sheets-Sheet 2
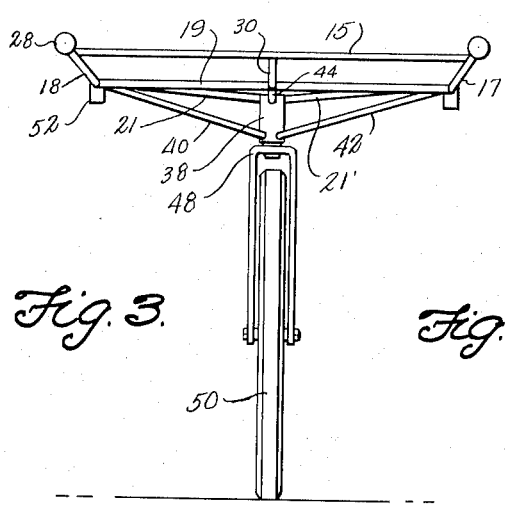
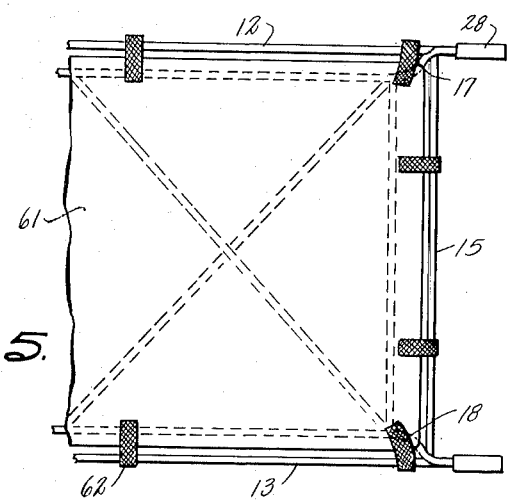
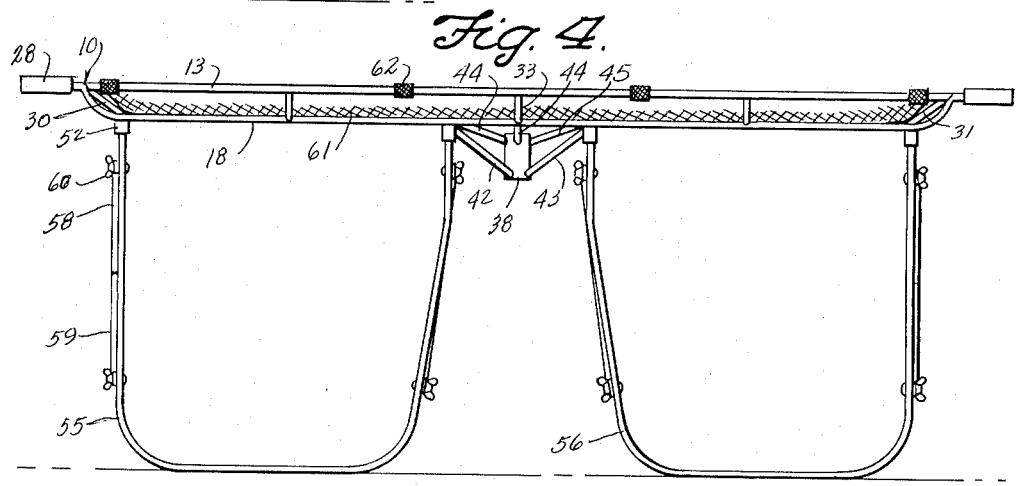
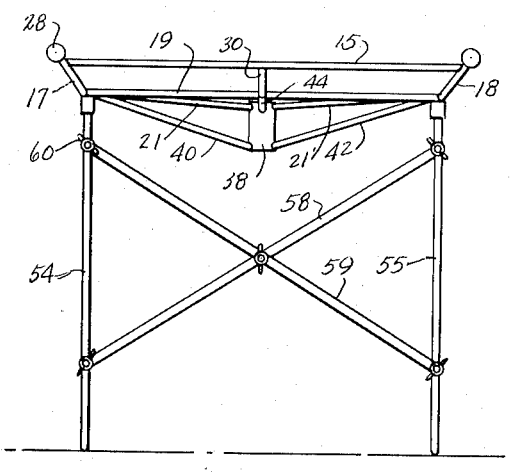
INVENTOR.
Lowell Q. Peterson,
BY
McMorrow, Berman & Davidson
ATTORNEYS United States Patent Office 2,715,030
Patented Aug. 9, 1955

2,715,030

MOBILE CARRIER

Lowell Q. Peterson, Nampa, Idaho

Application April 3, 1953, Serial No. 346,563

2 Claims. (Cl. 280—30)

This invention relates to mobile carriers and more particularly to a single wheeled mobile carrier which can be propelled by a person and used for transporating moderate loads, such as camping equipment and the carcasses of game animals, over trails or across country.

It is among the objects of the invention to provide an improved mobile carriage which is supported on a single wheel and which can be easily propelled and guided by one or two persons; which can be moved over rough trails or across open country and will carry moderate loads, such as camping equipment and the carcasses of large game animals; which can also be used as a mobile stretcher and, with the wheel removed and suitable legs attached, can be used as a camp cot or a table; which is of light weight and can be readily transported on an automobile top or in other convenient ways; and which is simple, strong and durable in construction, economical to manufacture, and convenient and easy to use.

Other objects and advantages will become apparent from a consideration of the following description and the appended claims in conjunction with the accompanying drawings wherein:

Figure 1 is a top plan view of a mobile carrier illustrative of the invention;

Figure 2 is a side elevational view of the carrier illustrated in Figure 1;

Figure 3 is an end elevational view of the carrier;

Figure 4 is a side elevational view of the carrier when modified for use as a cot or table;

Figure 5 is a fragmentary top plan view of the carrier when modified as illustrated in Figure 4; and Figure 6 is an end elevational view of the carrier when modified as shown in Figure 4.

With continued reference to the drawings, the carrier comprises a frame, generally indicated at 10, of elongated, rectangular shape, and comprising an outer frame structure 11 having spaced apart and substantially parallel side rails 12 and 13 and spaced apart and substantially parallel end rails 14 and 15 extending between the side rails and joined at their respectively opposite ends to the corresponding ends of the side rails 12 and 13, the end rails being disposed substantially perpendicular to the side rails. The frame also includes an inner frame structure 16 having spaced apart and substantially parallel side rails 17 and 18 disposed inwardly of and parallel to the side rails 12 and 13 of the outer frame structure, and rails 19 and 20 disposed in spaced apart and substantially parallel relationship to each other and extending between and connected at their respectively opposite ends to the inner side rails 17 and 18 at the respectively opposite ends of the inner frame structure. The inner frame structure also includes intermediate cross rails 22 and 23 equally spaced from the respectively opposite sides of the mid-length location of the inner frame and extending parallel to each other between and perpendicular to the inner side rails 17 and 18 and secured at their respectively opposite ends to these inner side rails, and diagonal braces, including brace members 24 and 25 extending between diagonally opposite corners of the rectangle included between the end rail 19 and the intermediate rail 22 and the corresponding portions of the inner side rails 17 and 18 and the brace members 26 and 27 extending between diagonally opposite corners of the rectangle included by the end rail 20, the intermediate rail 23 and the corresponding portions of the side rails 17 and 18.

The inner and outer frame structures are formed of lengths of suitable, thin walled metal tubing welded together at their interconnected ends and the members of the inner frame structure have their longitudinal center lines substantially in a common plane which is parallel to and spaced from the plane including the longitudinal center lines of the rails constituting the outer frame. The side rails 17 and 18 of the inner frame are longitudinally curved outwardly of the corners of the inner frame and extend across the adjacent corners of the outer frame and beyond the corners of the outer frame. These longitudinally curved and outwardly extending portions of the side rails of the inner frame are rigidly secured to the outer frame at the corresponding corners thereof and the portions of the side rails 17 and 18 projecting beyond the corners of the outer frame are provided with sleeves or grips, as indicated at 28, of resilient material, such as rubber, to provide two spaced apart handles at each end of the frame 10 which may be grasped by a person using the carriage to guide and propel the carriage and hold it in an upright position.

The inner frame structure 16 is centered relative to the outer frame structure 11 and struts extend between the perimetrical members of the inner frame and the adjacent members of the outer frame, one strut 30 extending between the frame end members 14 and 19, and another strut 31 extending between the frame end members 15 and 20 medially of the width of the frame, a strut 32 extending between the frame side members 12 and 17, and a similar strut 33 extending between the frame side members 13 and 18 medially of the length of the frame, struts 34 and 35 extending between the side rails 12 and 17 substantially medially of the distances between the centrally located strut 32 and the opposite ends of the outer frame structure, and strut members 36 and 37 extending between the side rails 13 and 18 medially of the distances between the center strut member 33 and the respectively opposite ends of the outer frame structure 11.

A bearing sleeve 38 is disposed at the center of the inner frame 16 with its longitudinal center line perpendicular to the plane of the longitudinal center lines of the members constituting the inner frame and with the end thereof adjacent said plane spaced from the plane in a direction away from the plane of the center lines of the members constituting the outer frame 11. Struts 21 and 21' extend from the inner side rails 17 and 18 respectively to the top end of the bearing sleeve 38 and are disposed parallel to the intermediate cross rails 22 and 23 and medially of the width of the space between these intermediate cross rails and struts 44 and 45 extend from the mid-length locations of the cross rails 22 and 23 respectively to the top end of the sleeve 38 and are disposed substantially perpendicular to the intermediate cross rails. Diagonal braces 40, 41, 42 and 43 extend one from each corner of the rectangle included between the intermediate cross members 22 and 23 of the inner frame and the associated portions of the side rails 17 and 18 to the bottom end of the bearing sleeve 38 and are inclined away from the plane of the inner frame in a direction from the corresponding ends of the intermediate cross members 22 and 23 and the bearing sleeve 38, and these struts together with the struts 21, 21', 47 and 48 rigidly secure the bearing sleeve in position below and centrally of the frame with its longitudinal center line perpendicular to the planes of the inner frame structure 16 and the outer frame structure 11.

A caster fork 48, such as a conventional bicycle front fork, is journalled at one end in the bearing sleeve 38 and extends outwardly from the frame 10, this fork depending downwardly from the frame when the carriage is in upright position, as illustrated in Figures 2 and 3. A nut 49 threaded onto the upper end of the fork 48 above the upper end of the bearing sleeve 38 retains the upper end of the fork in the bearing sleeve, but is removable from the fork for removal of the fork and the associated fork carried wheel from the frame, when desired.

A wheel 50, such as a conventional, rubber tired bicycle wheel, is journalled in the fork 48 at the end of the fork remote from the bearing sleeve 38 in supporting relationship to the frame 10.

The above described structure provides a mobile carriage which can be propelled, guided and held in upright position by one person at one end of the carriage, although it can be handled more easily by two people, one at each end of the carriage, for transporting moderate loads, such as camping equipment, the carcasses of game animals, small boats, firewood, etc. By placing a suitable pad on the inner frame structure 16 within the outer frame structure 11, the carriage can be used as a mobile stretcher, the frame structure preferably being dimensioned for such use by having a length of approximately six feet eight inches and a width of approximately two feet.

Sockets, as indicated at 52, are mounted on the under side of the inner frame structure 16, one at each corner of the inner frame structure and one at each end of each of the intermediate cross members 22 and 23 of the inner frame structure. Four legs are provided for supporting the frame 10, three of the legs being illustrated in Figures 4 and 6 and designated at 54, 55 and 56, the fourth leg being directly behind the leg 56 in Figure 4, and not illustrated. Each of the legs is constituted by a length of metal tubing bent to U shape with the legs of the U-shaped structure being substantially coterminous and of a length to support the frame 10 at a desired height above a supporting base, such as a floor or the ground. The ends of each of the legs are inserted into corresponding sockets 52 depending from the under side of the inner frame structure 16, one end of each leg being inserted in a socket disposed at a corresponding corner of the inner frame and the other leg being inserted in the nearest socket disposed at an end of one of the intermediate cross members of the inner frame. Diagonal braces, as indicated at 58 and 59 in Figure 6, extend between each pair of legs at the corresponding sides of the mid-length location of the frame, one pair of braces extending between the sides of the legs adjacent the corresponding end of the frame, and another pair of braces extending between the sides of the corresponding pair of legs nearest the mid-length location of the frame to provide a rigid truss construction which maintains the four legs substantially perpendicular to the plane of the inner frame structure of the frame 10. The leg braces are preferably detachably secured to the legs by suitable means, such as bolts extending through the legs and through apertures in the braces near the ends of the braces and wing nuts, as indicated at 60, threaded one onto each of the bolts to detachably connect the braces to the corresponding legs.

When it is desired to use the device as a camp cot or a camp table, the fork 48 and wheel 50 are removed from the frame 10 by first removing the nut 49 from the fork and then slipping the upper end of the fork out of the bearing sleeve 38. The legs, as indicated at 54, 55 and 56, are then installed by placing the ends of the legs into the proper sockets 52 on the frame, and the cross or diagonal braces, as indicated at 58 and 59, are then attached to the legs to hold the legs substantially parallel to each other and perpendicular to the plane of the frame.

When the device, with the wheel removed and the legs attached, is to be used as a camp cot, a mattress 61, such as an air mattress, is placed on the inner frame structure 16 within the outer frame structure 11, as illustrated in Figures 4 and 5, suitable snap straps, as indicated at 62, attached to and extending outwardly from the mattress at locations spaced apart along the edges of the mattress being secured around the perimetrical members of the outer frame structure to hold the mattress in proper position in the frame.

When the device is to be used as a table, a flat plate, not illustrated, such as a piece of plywood, may be placed on the outer frame structure 11 to serve as the table top.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A portable device comprising an outer frame including a pair of side rails arranged in parallel spaced relation and an end rail extending between said side rails at each of the complemental ends thereof and joined to said ends, an inner frame arranged within and spaced from the outer frame, said inner frame including a pair of side rails arranged in parallel spaced relation with respect to the side rails of said outer frame and an end rail extending between the side rails of said inner frame adjacent the complemental ends thereof and joined to said side rails, the ends of the side rails of said inner frame projecting to and beyond the respective joinder points of said end rails and said side rails of the outer frame, and a handle on each of the projecting ends of said side rails of the inner frame, struts extending transversely between and joined to adjacent side rails of the inner and outer frames and between and joined to the adjacent end rails of the inner and outer frames, a pair of cross rails arranged in spaced relation positioned between and joined to the side rails of said inner frame and spaced from the end rails of said inner frame, and an upstanding bearing sleeve positioned substantially centrally of the space defined by and dependingly carried by said cross rails and the adjacent portions of the side rails of said inner frame for connection of a rotatable wheel thereto.

2. A portable device comprising an outer frame including a pair of side rails arranged in parallel spaced relation and an end rail extending between said side rails at each of the complemental ends thereof and joined to said ends, an inner frame arranged within and spaced from the outer frame, said inner frame including a pair of side rails arranged in parallel spaced relation with respect to the side rails of said outer frame and an end rail extending between the side rails of said inner frame adjacent the complemental ends thereof and joined to said side rails, the ends of the side rails of said inner frame projecting to and beyond the respective joinder points of said end rails and said side rails of the outer frame, a handle on each of the projecting ends of said side rails of the inner frame, struts extending transversely between and joined to adjacent side rails of the inner and outer frames and between and joined to the adjacent end rails of the inner and outer frames, a pair of cross rails arranged in spaced relation positioned between and joined to the side rails of said inner frame and spaced from the end rails of said inner frame, an upstanding bearing sleeve positioned substantially centrally of the space defined by and dependingly carried by said cross rails and the adjacent portions of the side rails of said inner frame for connection of a rotatable wheel thereto, and a depending socket carried by the joinder points of the end rails with the side rails of the inner frame and of the pair of cross rails with the side rails of the inner frame for reception of supporting legs.

References Cited in the file of this patent

UNITED STATES PATENTS

| | | |
|---|---|---|
| 2,416,492 | Neeley | Feb. 25, 1937 |
| 2,429,028 | Neeley | Oct. 14, 1947 |

FOREIGN PATENTS

| | | |
|---|---|---|
| 579,493 | Great Britain | Aug. 6, 1946 |
| 672,192 | Great Britain | May 14, 1952 |